United States Patent [19]
Faivre et al.

[11] Patent Number: 5,661,486
[45] Date of Patent: Aug. 26, 1997

[54] AIRCRAFT LANDING AID DEVICE

[75] Inventors: François Faivre; Xavier Denoize, both of St. Medard En Jalles, France

[73] Assignee: Sextant Avionique, Meudon la Foret, France

[21] Appl. No.: 419,269

[22] Filed: Apr. 10, 1995

[30] Foreign Application Priority Data

Apr. 15, 1994 [FR] France .................. 94 04521

[51] Int. Cl.⁶ .................. G01S 13/74; G01S 13/93
[52] U.S. Cl. .................. 342/33
[58] Field of Search .................. 342/33, 34, 35, 342/29, 36, 37, 38

[56] References Cited

U.S. PATENT DOCUMENTS

| | | | |
|---|---|---|---|
| 4,224,669 | 9/1980 | Brame | 342/33 |
| 4,646,148 | 2/1987 | Lienard et al. | 348/409 |
| 5,136,297 | 8/1992 | Lux et al. | 342/33 |
| 5,414,631 | 5/1995 | Denoize et al. | 364/461 |
| 5,483,241 | 1/1996 | Waineo et al. | 342/33 |

FOREIGN PATENT DOCUMENTS

| | | |
|---|---|---|
| 2 043 388 | 10/1980 | United Kingdom . |
| 2 165 427 A | 4/1986 | United Kingdom . |

*Primary Examiner*—Daniel T. Pihulic
*Attorney, Agent, or Firm*—Oblon, Spivak, McClelland, Maier & Neustadt, P.C.

[57] ABSTRACT

The disclosure is an aircraft landing aid device that includes at least a database containing signatures and positions of reference objects, a sensor picking up signatures of reference objects, means of navigation used to fix the approximate position of the aircraft, means of correlation connected to said means of navigation, sensor and database, that define the vertical and horizontal bearings of the objects picked up by said sensor, and means of fixing the exact position of the aircraft, connected to said means of navigation, sensor and database. It is applicable in particular to airliners, enabling landing in all weather conditions.

9 Claims, 3 Drawing Sheets

AIRCRAFT LANDING AID DEVICE

BACKGROUND OF THE INVENTION

The present invention concerns an aircraft landing aid device, used notably in bad weather. It is applicable to all types of aircraft.

The large increase in commercial air traffic in recent years has enabled significant technical progress in the field of safety in flight and reduction of operating costs.

In particular, the introduction of all-weather landing aid systems, known as Instrument Landing Systems (ILS) or Microwave Landing Systems (MLS) now permit landing and take-off in poor weather conditions. Ground proximity detection systems have also contributed to safety.

Nevertheless, the capital investments required at airports to implement such systems are very heavy. Consequently, many airports world-wide—even ones open to international traffic—are not equipped with radio guidance systems necessary for all-weather landing, used notably in fog, for example, which means that commercial airlines are deprived of these unequipped airports in bad weather. The commercial and financial consequences for airlines are can be very serious.

SUMMARY OF THE INVENTION

The object of the present invention is a device enabling landing in all weather conditions yet requiring only a small investment.

The object of the invention is therefore an aircraft landing aid device that includes at least:
  a database containing signatures and positions of reference objects;
  a sensor picking up signatures of reference objects;
  means of navigation used to fix the approximate position of the aircraft;
  means of correlation connected to said means of navigation, sensor and database, that define the vertical and horizontal bearings of the objects picked up by said sensor;
  means of fixing the exact position of the aircraft, connected to said means of navigation, sensor and database.

The main advantages of the invention are that it improves the safety of aircraft landing operations, it increases the effectiveness of primary landing aids of ILS or MLS type, for example, by adding a secondary data acquisition system. Finally it is easy to use and adaptable to all types of aircraft.

BRIEF DESCRIPTION OF THE DRAWINGS

Other characteristics and advantages of the invention will become apparent on reading the following description with reference to the attached drawings which represent.

DESCRIPTION OF THE INVENTION

Figure 1:
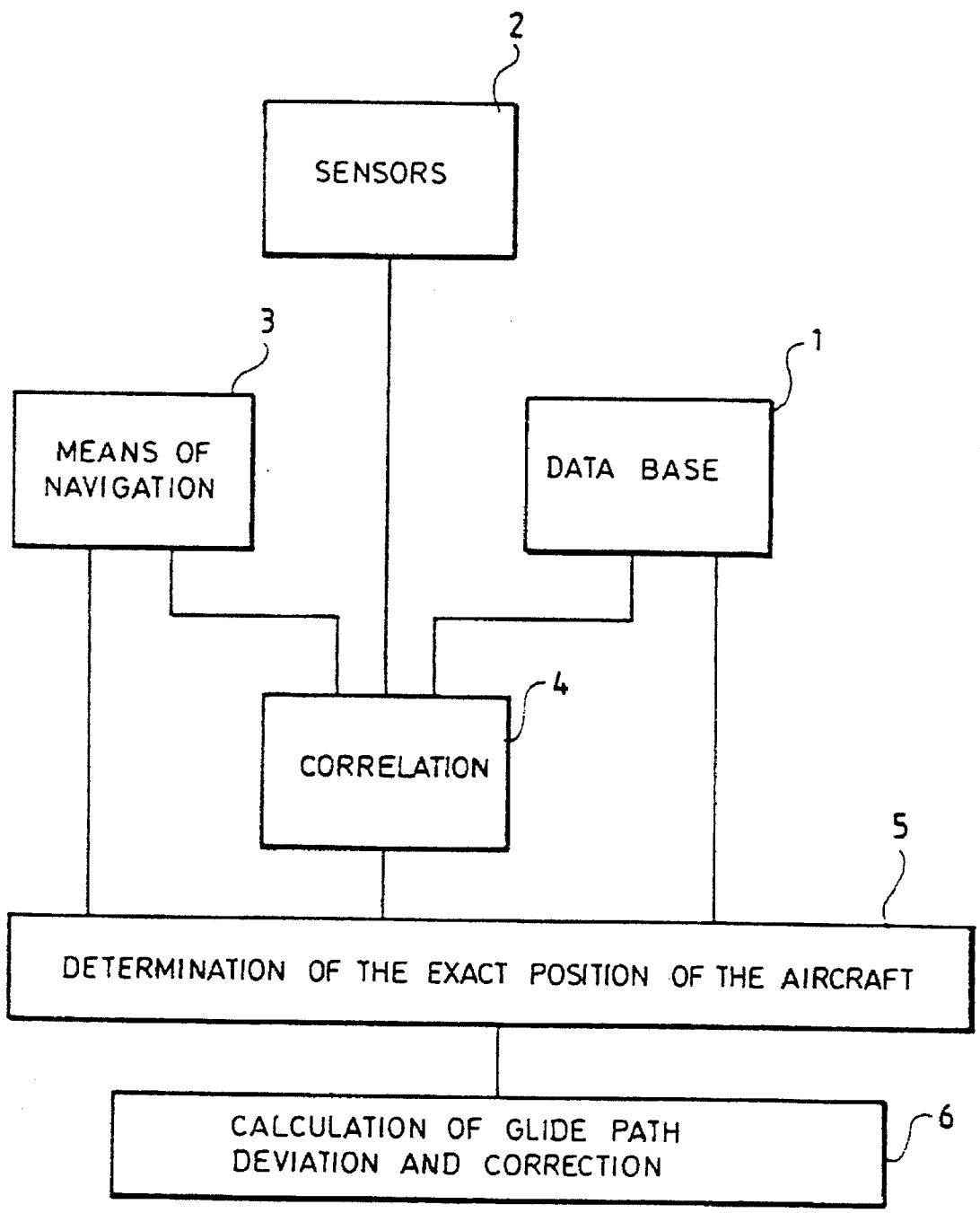
FIG. 1: block diagram of an embodiment of a device according to the invention.

FIG. 1 shows a block diagram of an embodiment of a device according to the invention fitted to an aircraft.

The device includes at least one database 1 containing the signatures of reference objects, each one corresponding to at least one characteristic of these objects in one or more spectral bands of the sensors 2.

Moreover, the database contains the positions of these objects which are, for example, on the ground, stationary and located in the vicinity of the runway of an airport. The device according to the invention can use one or more sensors 2, but in the rest of this description we shall consider the case of a single sensor. The sensor 2 is, for example, constituted by the weather radar of the aircraft, a millimeter band radar and an on-board infra-red sensor. The database 1 can contain information other than the signatures mentioned above. These data may concern safe altitude thresholds, landing procedures, for example at all airports world-wide or only the ones where the aircraft might go.

The device according to the invention includes means of navigation 3 enabling the approximate position of the aircraft to be determined. Once this approximate position is known, if these means 3 are connected to the database 1, a safe altitude or landing procedure can be read from the database, corresponding to this known position, if such information has been stored in the database.

The database 1, the sensor 2 and the means of navigation 3 are connected to the means of correlation 4. The correlation maxima and knowledge of the geometry of the sensor 2 enable calculation of the vertical and horizontal bearings of each of the objects whose signature is picked up by the sensor 2.

The database 1, the means of navigation 3 and the means of correlation 4 are connected to the means 5 of fixing the exact position of the aircraft. Knowledge of the bearings of several objects, whose signatures and positions are stored in the database 1, enables the exact geographic position of the aircraft to be computed. The term "exact" is taken to mean that the precision of the position fix is sufficient to enable a landing to be made in safety. This position fixing is carried out for example using a triangulation method based on three objects in the vicinity of the airport at which the aircraft is to land and whose signatures and positions are stored in the database 1.

The means 5 of fixing the exact position of the aircraft can be connected to aircraft's means 6 of calculation of glide path deviation and correction. In this case the position fixing means 5 send the exact position of the aircraft to these means 6 which then compute, for example, the deviation of the aircraft from a theoretical glide path, followed by the course correction data required to bring the aircraft onto the glide path. These computations are based on the point of touchdown of the aircraft on the runway and the landing procedure for this runway, which are extracted from the database 1.

The means of correlation 4, position fixing means 5 and the means 6 of calculation of the glide path deviation and correction can be provided by single computer.

Figure 2:
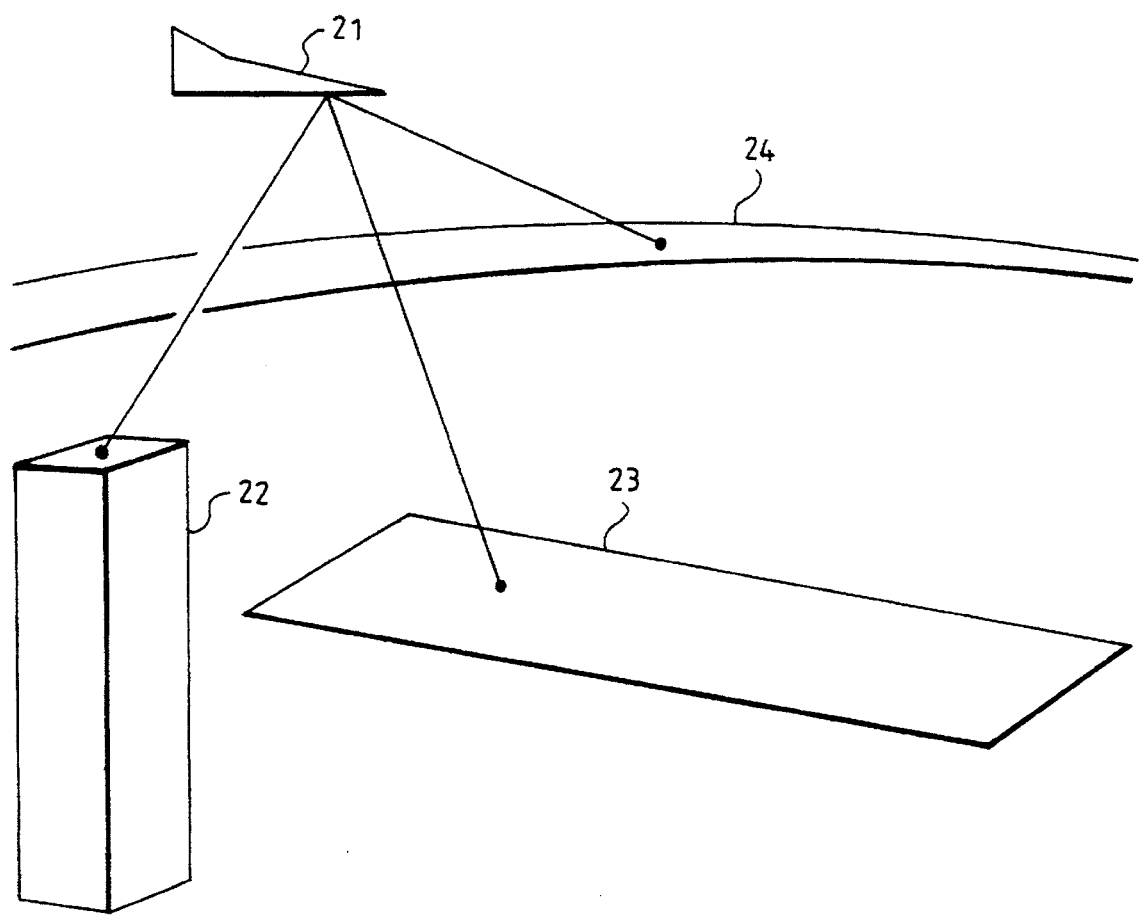
FIG. 2: example of an application of a device according to the invention.

FIG. 2 shows an example of an application of a device according to the invention. An aircraft 21 fitted with such a device and approaching an airport detects via his sensor(s) 2, three objects 22, 23 and 24 which are for example a tower 22 near the airport, a runway 23 of the airport, for example the one on which the aircraft is to land, and a highway 24 near the airport. Once the sensor 2 has picked up the signatures of these three singular points 22, 23 and 24, they are compared with those in the database. The exact position of the sensor 2, and thus the aircraft 21, is then computed by triangulation, using the exact positions of these objects obtained from the database 1.

The weather radar with which all commercial aircraft are equipped can provide the function of the sensor 2, thus avoiding the supplementary cost of a separate sensor. This function could alternatively be provided by a millimeter band radar which, without delivering images to the pilot, can nevertheless pick up echoes from objects whose signatures are stored in the database 1.

The objects used will be chosen in such a manner as to avoid any possibility of ambiguity between their signatures. The similarity of objects around different airports poses no problem in that the means of navigation can be used to indicate which airport is being approached.

FIG. 2 shows that the objects whose signatures and positions are stored in the database can be simple objects such as a tower, a road, a bridge, a runway or a natural feature. This has the advantage of avoiding any need for special infrastructure, thus reducing the cost of implementation and maintenance at airports. However, it is also possible to use objects specially designed to produce characteristic echoes to be picked up by the sensor 2 of the device according to the invention. These objects could be, for example, aluminum panels which represent a modest investment for any airport.

These objects are preferably on the ground and stationary, although they could be mobile, either airborne or on the ground, notably to provide dynamic guidance for the aircraft.

Figure 3:
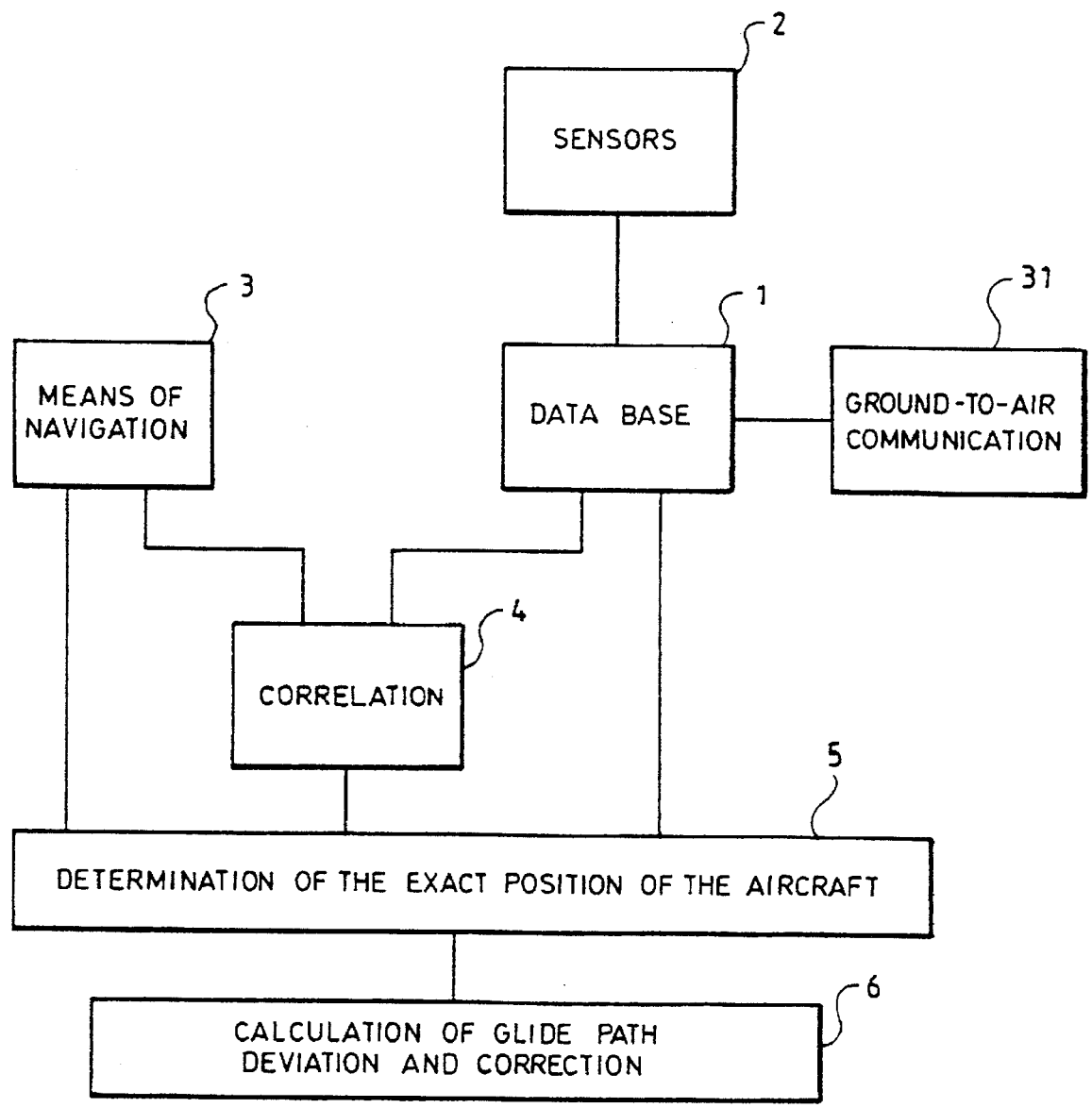
FIG. 3: block diagram of another embodiment of a device according to the invention.

FIG. 3 shows a block diagram of an embodiment of a device according to the invention, similar to that of FIG. 1 but including in addition means of communication 31 with the ground, connected to the database 1. This enables, in particular, the signature and position data of the reference objects to be received by radio, for example, once the final destination of the aircraft is known, rather than extracting them from the database 1. This has the advantage of avoiding the need for a large database, since the information received need not be stored permanently.

The device according to the invention constitutes an independent position-fixing system for the aircraft, backing up the aircraft's navigation system—even at airports not equipped with radio-navigation aids. This enables aircraft to land at airports in all weather conditions, notably in conditions of poor visibility.

Finally, since the device according to the invention constitutes an independent position-fixing system is can be used in conjunction with the main landing system, of ILS or MLS type for example, to improve the overall safety, notably by making use of the calculated deviations from the theoretical glide path calculated by the device.

What is claimed is:

1. An aircraft landing aid device positioned on board an aircraft for assisting in the landing at an airport, said device comprising:

a database containing signatures and positions of three reference objects located in the immediate vicinity of said airport;

a sensor means for detecting said signatures of said three reference objects;

navigation means for determining the approximate position of said aircraft;

correlation means connected to outputs of said navigation means, said sensor means and said database wherein said correlation means provides an output which defines vertical and horizontal bearings of said three objects;

means for fixing an exact position of said aircraft wherein said means for fixing is connected to an output of said navigation means, an output of said sensor and said database and wherein said fixing means computes said exact position by triangulation as a function of the identification of said three reference objects and the exact position of said three reference objects.

2. Device according to claim 1, that includes means of calculation of glide path deviation and correction, connected to said means for fixing the exact position of the aircraft.

3. Device according to claim 1, wherein said sensor is a weather radar.

4. Device according to claim 1, wherein said sensor is a millimeter band radar.

5. Device according to claim 1, wherein said database is connected to means assuring ground-to-air communication.

6. Device according to claim 5, wherein said signatures and positions of said three reference objects are received by radio from the airport and then stored in said database.

7. Device according to claim 2, wherein said means of calculation of glide path deviation and correction compute first the aircraft's deviation from a theoretical glide path, then a course correction enabling the aircraft to be brought back to this glide path, these computations making use of data in said database defining the point of touch-down on the landing runway and the landing procedure.

8. Device according to claim 2, wherein said means of correlation, said means of fixing the exact position of the aircraft and said means of calculation of glide path deviation and correction are included in a single computer.

9. Device according to claim 2, wherein the aircraft's deviation from a theoretical glide path is used to improve the reliability of the primary landing aid system.

* * * * *